W. J. STEVENS.
Devices for Operating the Valves of Steam-Engines.
No. 142,292. Patented August 26, 1873.
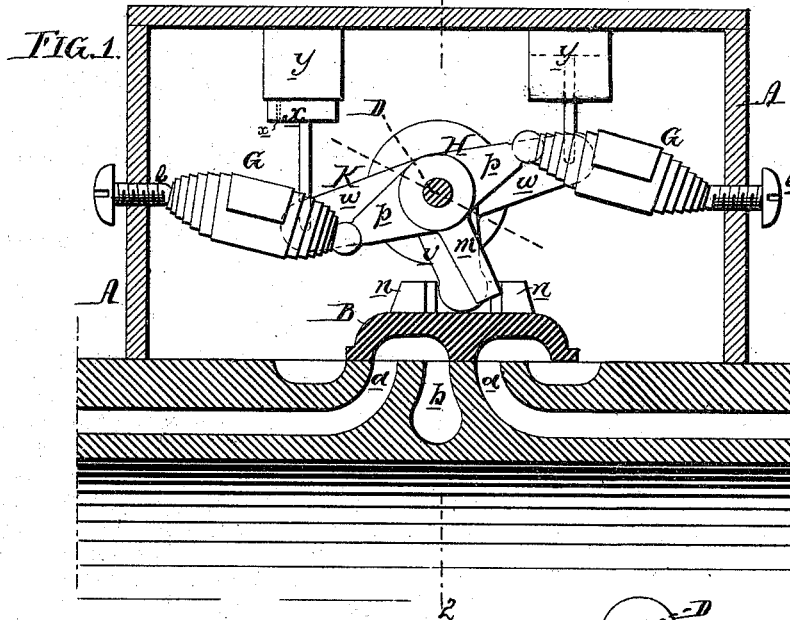
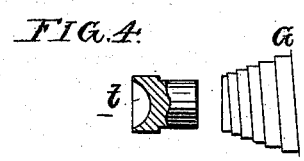
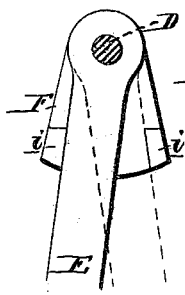
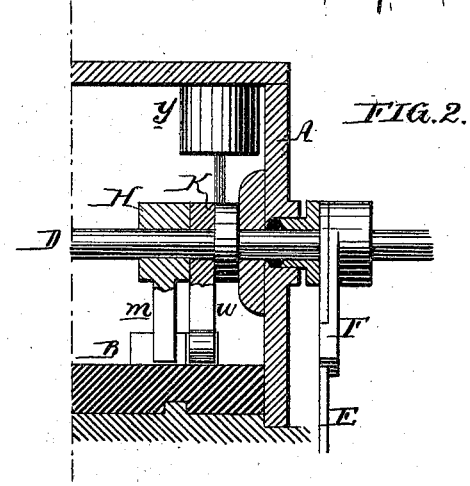
Witnesses, Hubert Howson, Harry Smith
William J. Stevens
By his Attys.
Howson and Son

UNITED STATES PATENT OFFICE.

WILLIAM J. STEVENS, OF NEW YORK, N. Y., ASSIGNOR TO HIMSELF, DUDLEY S. STEELE, AND NATHAN W. CONDICT, JR., OF JERSEY CITY, N. J.

IMPROVEMENT IN DEVICES FOR OPERATING THE VALVES OF STEAM-ENGINES.

Specification forming part of Letters Patent No. 142,292, dated August 26, 1873; application filed May 15, 1873.

*To all whom it may concern:*

Be it known that I, WILLIAM J. STEVENS, of the city, county, and State of New York, have invented certain Improvements in Valves for Steam-Engines, of which the following is a specification:

The object of my invention is to operate the valve of a steam-engine—such, for instance, as a direct-action steam-pump—directly from the piston-rod, with the aid of springs contained within the steam-chest, in conjunction with other appliances which I will now proceed to describe, and which are illustrated in the accompanying drawing—

Figure 1 being a vertical section of the steam-chest, cylinder-ports, valve, and mechanisms for operating the same; Fig. 2, a transverse section on the line 1 2; and Figs. 3 and 4, detached views of parts of the valve.

A is the steam-chest, containing a valve, B, adapted to steam-ports $a$ $a'$ and exhaust-port $b$, in a manner common to steam-pumps, and too well known to need description. A rock-shaft, D, passes through and has its bearings on opposite sides of the steam-chest, and this shaft derives its motion from the piston-rod of the engine through the medium of a lever, E, and arm F, the latter being secured to the rock-shaft, and the lever, which is connected to the piston-rod of the engine, being arranged to vibrate freely on the said shaft, and, as it vibrates, to strike alternately the projections $i$ $i$ on the arm F, the vibration of which, and consequently of the shaft, must be intermittent. To the shaft D, and, by preference, inside the steam-chest, is secured a lever, H, having two arms, $p$ $p$, projecting in line with each other from opposite sides of the shaft, and a third arm, $m$, arranged at right angles to the former arms. Between the end of each arm $p$ and a set-screw passing through the steam-chest intervenes a spring, G, the two springs tending to maintain the three-armed lever H in the position illustrated in Fig. 1, or in the reverse position shown by dotted lines. The third arm $m$ of the lever is arranged to strike alternately projections $n$ $n$ on the valve B. The movement of the lever H is effected partly by the piston-rod through the medium of the lever E and arm F, and partly by the springs G. Thus, supposing the lever and valve to be in the position shown in Fig. 1, the said lever will be moved by the piston-rod to such an extent only as will enable the springs G G to complete the movement to the position shown by dotted lines, and the space between the projections $n$ $n$ on the valve is such that its movement is effected entirely by the action of the springs, the preliminary movement of the lever H before it begins to act on the valve being accomplished by the direct action of the piston-rod, and the subsequent or remaining portion of the movement of the lever H by means of the springs alone, being permitted by the distance at which the projections $i$ $i$ on the arm F are arranged from each other, which permits a limited play of the said arm F independently of the lever E.

By this arrangement and operation of the above-described parts, the movement of the valve takes place at the precise point demanded by the position of the piston in the cylinder, and the desired dwell or hesitation of the valve after the completion of each movement is insured. It is necessary, however, that the valve should be under such controlling influence that it cannot be projected beyond the proper points by the impetus which the springs impart to the lever H. Different devices for arresting the valve at the proper points will readily suggest themselves to engineers; but I prefer the plan which I will proceed to describe, as I have found it to be the most efficient in practice.

Inside the steam-chest a three-armed lever, K, is hung loosely to the rock-shaft D, two of its arms, $w$ $w$, being in line with each other, as shown in Fig. 1, and each arm being connected to a piston, $x$, adapted to a small cylinder, $y$, on the under side of the steam-chest cover, the third arm $v$ being so adapted to a recess in the back of the valve B that it can have no longitudinal play therein.

When the valve has reached the proper limit of its movement in either direction it is arrested by one of the pistons $x$ coming in contact with the end of its cylinder; but, as the piston has a small hole through which steam can pass into the said cylinder, the sudden movement of the piston, caused by the action of the springs, is in a measure arrested by a cushion of steam, which suffices to obviate all shocks, without in any way interfering with the prompt and determinate action of the valve.

Although different springs may be arranged within the steam-chest to contribute to the movement of the lever H, I prefer those illustrated in the drawing. Each of these springs consists of a double helix, into each end of which I introduce a stud, $t$, of hardened steel, one stud having a concave recess adapted to the convex end of one of the arms $p$ of the lever H, and the other stud to the similarly-shaped end of the set-screw $e$, these convex studs being well adapted for resisting the friction to which they are subjected, and being easily replaced with new ones.

It will be apparent that the springs may act on the valve through the medium of devices other than those described.

I claim as my invention—

1. The combination, with a slide-valve, of an operating rock-shaft, D, springs G G, and devices whereby the movement of the shaft in either direction is first imparted from some moving part of the machine, and is continued and completed by the action of the springs, as set forth.

2. The combination, with the valve B, of the three-armed lever H, helical springs G G, and set-screws $e$.

3. The combination of the rock-shaft D, its arm F, having projections $i$ $i$, and the loose lever E, connected to the piston-rod of the engine with an arm, $m$, for acting on the valve, and with springs for aiding the rock-shaft to operate the valve, as set forth.

4. A valve, B, operated from some moving part of the engine, and limited in its movements by a piston acting against a cushion of steam in a chamber, substantially as set forth.

In testimony whereof I have signed my name to this specification in the presence of two subscribing witnesses.

WILLIAM J. STEVENS.

Witnesses:
HAMILTON WALLIS,
J. F. McGEE.